(12) United States Patent
Elias

(10) Patent No.: US 7,609,729 B2
(45) Date of Patent: Oct. 27, 2009

(54) SYSTEM AND METHOD OF MULTIPLEXING TDM AND PACKET DATA

(75) Inventor: Paul Elias, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 1092 days.

(21) Appl. No.: 10/161,089

(22) Filed: May 31, 2002
(Under 37 CFR 1.47)

(65) Prior Publication Data

US 2003/0147379 A1 Aug. 7, 2003

Related U.S. Application Data

(60) Provisional application No. 60/295,160, filed on Jun. 1, 2001.

(51) Int. Cl.
*H04J 3/02* (2006.01)
(52) U.S. Cl. .................. 370/537; 370/235; 370/532; 370/535; 370/352
(58) Field of Classification Search ............... 370/235, 370/314, 340, 465–466, 470–480, 493, 532, 370/535, 536, 537, 538, 539, 352
See application file for complete search history.

(56) References Cited

U.S. PATENT DOCUMENTS

| | | | | |
|---|---|---|---|---|
| 5,309,441 A | * | 5/1994 | Kuroda | 370/510 |
| 5,596,730 A | * | 1/1997 | Sekine | 710/317 |
| 5,862,136 A | * | 1/1999 | Irwin | 370/395.4 |
| 6,611,591 B1 | * | 8/2003 | McNiff et al. | 379/268 |
| 6,633,584 B1 | * | 10/2003 | Russell et al. | 370/466 |
| 6,735,170 B1 | * | 5/2004 | Roberts | 370/230 |
| 6,775,478 B2 | * | 8/2004 | Suzuki et al. | 398/75 |
| 6,888,791 B1 | * | 5/2005 | Ellis et al. | 370/227 |
| 7,061,935 B1 | * | 6/2006 | Roy et al. | 370/468 |
| 2002/0181482 A1 | * | 12/2002 | Dally et al. | 370/412 |
| 2004/0190548 A1 | * | 9/2004 | Harel et al. | 370/466 |
| 2004/0208554 A1 | * | 10/2004 | Wakai et al. | 398/54 |
| 2004/0213253 A1 | * | 10/2004 | Evans | 370/395.1 |
| 2005/0025177 A1 | * | 2/2005 | Huckett et al. | 370/466 |
| 2005/0089026 A1 | * | 4/2005 | Klish, II | 370/352 |

* cited by examiner

*Primary Examiner*—Kwang B Yao
*Assistant Examiner*—Nguyen Ngo
(74) *Attorney, Agent, or Firm*—Gardere Wynne Sewell LLP; Marc. A. Hubbard

(57) ABSTRACT

Telecommunication equipment includes a TDM interface operable to receive STS-n data, and a packet interface operable to receive packet/cell data and filling a STS-MC payload with the packet/cell data. An n×n cross-connect is coupled to the TDM interface and operable to switch and assign the STS-n data to any one of n STS-1 time slots. A multiplexer is coupled to the cross-connect and the packet interface and operable to combine the switched STS-n data and the STS-MC packet/cell data into an STS-N payload for transport, where N is the sum of n and M.

8 Claims, 1 Drawing Sheet

SYSTEM AND METHOD OF MULTIPLEXING TDM AND PACKET DATA

RELATED APPLICATION

The present application claims priority to provisional application Ser. No. 60/295,160, filed on Jun. 1, 2001, entitled "SYSTEM AND METHOD OF MULTIPLEXING TDM AND PACKET DATA."

TECHNICAL FIELD OF THE INVENTION

This invention relates to telecommunications network and equipment, and more particularly, to a system and method of multiplexing TDM (time division multiplexed) and packet data.

BACKGROUND OF THE INVENTION

The different characteristics of voice and data traffic are well known in the telecommunications industry. Data traffic is likely to be high bandwidth but bursty. Legacy time-division multiplex (TDM) circuit-based networks, on the other hand, were originally designed to carry voice traffic, which tends to occupy smaller and predictable bandwidths over a longer period of time. With the growth of data traffic outpacing voice traffic, telecommunications network equipment makers and service providers must find ways to still accommodate TDM traffic but provide more bandwidth-efficient mechanisms to transport the TDM traffic and packet and cell data traffic.

Today's multi-service telecommunication network architecture attempts to service and transport TDM, asynchronous transfer mode (ATM), and frame-based packet-switching telecommunication data. To multiplex packet/cell data and TDM data in the access network, a STS-1 level switch that provides the entire bandwidth assignment of the TDM and packet/cell data is typically used to combine the data into a provisioned SONET interface, such as OC48. The switch allows the TDM data to be assigned to any of the timeslots across the entire bandwidth of STS-1 channels. A framer device then creates from the remaining available time-slots concatenated channels in STS-1 increments of arbitrary sizes (e.g., STS-3C, STS-27C, STS-45C, etc.) for the packet/cell data. The result is a single logical transport pipe into which the TDM and packet/cell data are transported.

The evolving telecommunications network is best served by access and transport devices that provide large (1 to 10 Gb/s) packet or cell service ports transmitting and receiving IP (Internet protocol) packets, for example, and legacy TDM (time division multiplexed) service ports (1.5 Mb/s or 45 Mb/s). The packet data and TDM data are combined into a single optical uplink for transport. In existing multi-service access and transport systems that provide combined packet and cell data and TDM data, the cumulative data is combined into a single OC3 to OC48 optical uplink pipe.

It may be seen that the aforementioned conventional implementation has tremendous power dissipation and device size feasibility problems for large bandwidths. Next generation multi-service systems that have large packet/cell aggregate bandwidths (e.g., 16 Gb/s) and large aggregate TDM bandwidths (e.g., 2.5 Gb/s) would require a large STS-1 switch fabric (e.g., 384×384 STS-1 switch) and very complex framer devices. At these exemplary bandwidths, the required uplink capacity is that of an OC192 transport pipe. The resulting system design, constrained by existing ASIC (application-specific integrated circuit) technologies, will result in very large multi-device and multi-circuit card solutions.

SUMMARY OF THE INVENTION

It may be seen that there is a need for an elegant solution to the high bandwidth multi-service system which multiplexes packet/cell and TDM data for transport by a single optical uplink. The present invention assigns TDM data to a single contiguous block of a maximum number of time-slots either at the beginning or the end of the optical payload, and fills the remaining continuous available time-slots with packet/cell data. The TDM and packet/cell bandwidths can be adjusted to fit within the optical payload bandwidth. Therefore, this elegant solution requires an STS-1 switch only of a size needed to switch the maximum TDM time-slots provisioned in the system. For example, if the maximum TDM bandwidth is STS-48, then the size of the required switch would be 48×48, not the entire payload size.

In accordance with an embodiment of the present invention, telecommunication equipment includes a TDM interface operable to receive STS-n data, and a packet interface operable to receive packet/cell data and filling a STS-MC payload with the packet/cell data. An n×n cross-connect is coupled to the TDM interface and operable to switch and assign the STS-n data to any one of n STS-1 time slots. A multiplexer is coupled to the cross-connect and the packet interface and operable to combine the switched STS-n data and the STS-MC packet/cell data into an STS-N payload for transport, where N is the sum of n and M.

In accordance with another embodiment of the present invention, a method including the steps of switching and assigning STS-n data to any one of n STS-1 time slots, and combining the switched STS-n data and STS-MC packet/cell data into an STS-N payload for transport, where N is the sum of n and M.

In accordance with yet another embodiment of the present invention, a method of combining and transporting a first and a second telecommunication data includes the steps of switching and assigning each channel of the first telecommunication data to any one of n contiguous time slots, assigning the second telecommunication data to M contiguous time slots, and combining the switched first telecommunication data in n time slots and the second telecommunication data in M time slots into a payload having N time slots for transport, where N is the sum of n and M.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
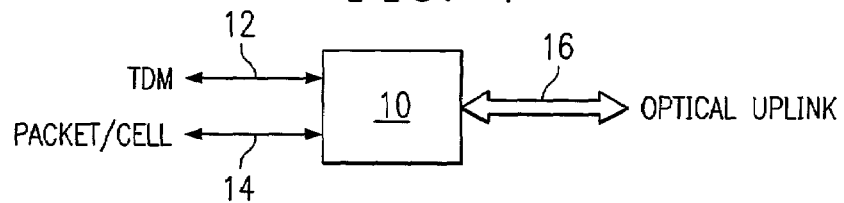
FIG. 1 is simplified block diagram of a framer operable to combine TDM and high bandwidth packet data into a single optical payload according to the teachings of the present invention.
Figure 2:
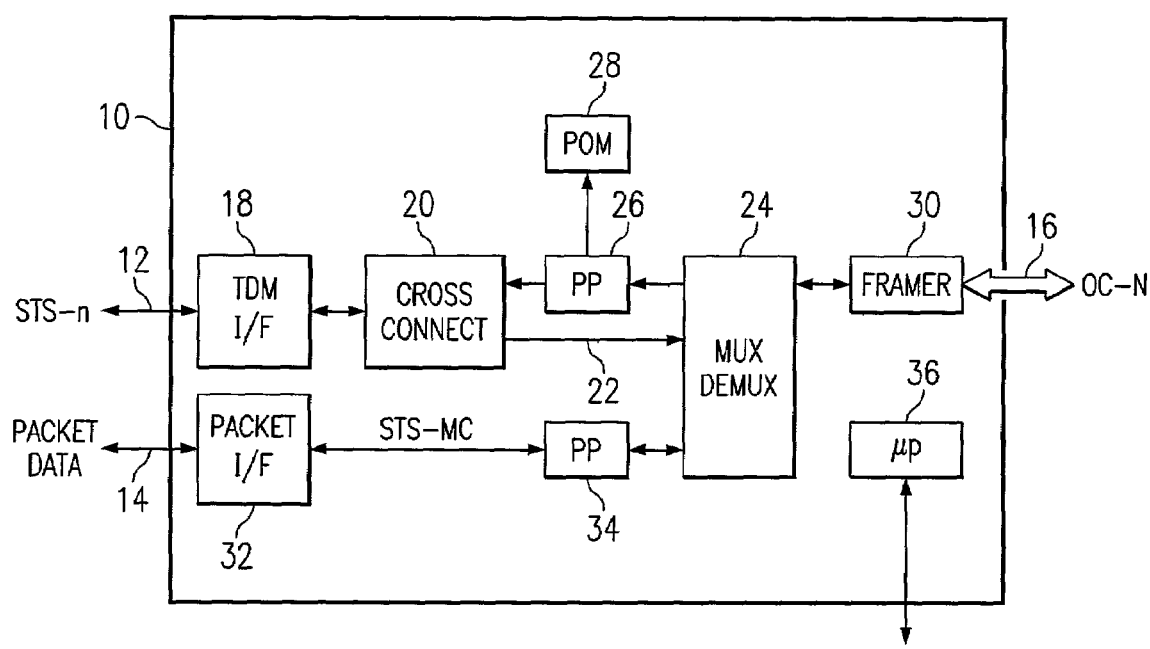
FIG. 2 is a more detailed block diagram of an embodiment of a framer operable to combine TDM and high bandwidth packet data into a single optical payload according to the teachings of the present invention.
Figure 3:
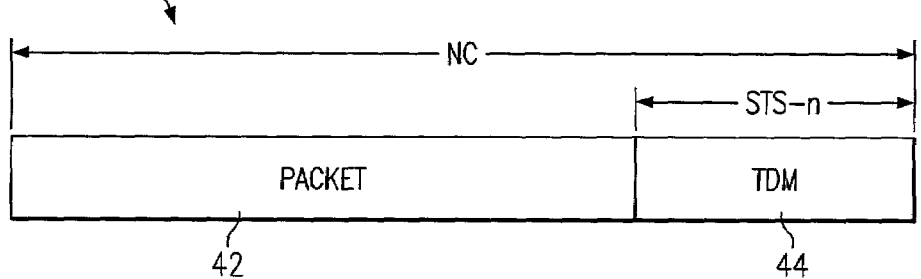
FIG. 3 is a diagram showing an embodiment of the optical payload format with a movable packet-TDM bandwidth boundary.

The preferred embodiment of the present invention and its advantages are best understood by referring to FIGS. 1 through 3 of the drawings, like numerals being used for like and corresponding parts of the various drawings.

FIG. 1 is simplified block diagram of a framer device 10 operable to combine TDM and high bandwidth packet data into a single optical payload according to the teachings of the present invention. Framer 10 receives TDM data 12 and IP (Internet protocol) packet or ATM (asynchronous transfer mode) cell data 14 and combines the two types of data into a single payload 16 in an optical format, such as OC192, for transport. In the other direction, framer 10 receives optical payload 16 and splits the TDM data out from the packet data. The demands of today's multi-media applications require high speed bandwidths on the order of 10 Gb/s for IP data multiplexed with smaller bandwidths of TDM data, which is on the order of 150 Mb/s to 2.5 Gb/s.

FIG. 2 is a more detailed block diagram of an embodiment of framer 10 operable to combine TDM and high bandwidth packet data into a single optical payload according to the teachings of the present invention. A TDM interface 18 receives TDM data 12, STS-n (synchronous transport signal level), where n can be one up to a predetermined integer. For example, TDM data 12 may include from zero STS-1 signals up to STS-48 signals. STS-n is composed of n byte-interleaved STS-1 signals. TDM interface 18 is operable to provide functions such as framing and payload pointer phase alignment. A n×n cross-connect 20 is an STS-1 level switch that provides the bandwidth assignment of the TDM data into a provisioned SONET payload 22. According to the present invention, the TDM data is allocated to either the beginning or the end of the payload, and the remaining bandwidth allocated to packet/cell data. Referring to FIG. 3, it may be seen that in one embodiment of the present invention, STS-n TDM data occupies a block 44 of n STS-1 time slots near the end of the payload bandwidth. The boundary between TDM data 44 and packet/cell data 42 in the payload is elastic—it can be moved toward either end up to a predetermined maximum STS-N for the TDM data. A packet interface 32 receives M concatenated (MC) STSN payload, where M ranges from N to N-n. For example, MC may be range from 192C to 144C, where the TDM data ranges from zero STS-1 to STS-48. A pointer processing block 34 provides pointer phase alignment and other functions prior to sending the packet data to a multiplexer/demultiplexer (MUX/DEMUX) 24. MUX/DEMUX 24 is operable to combine the respective STS-n TDM data and the MC packet data according to the present invention to produce a combined STS-N signal structure. A framer 30 then applies the required SONET transport overhead into the STS-N signal before conversion to optical signal and transmission as an OC-N, for example OC-192, optical payload 16. A microprocessor 36 is operable to generate control signals for controlling the various components in framer 10, and to interface with other telecommunication equipment.

In the other direction, an OC-N optical payload 16 is received by framer 30 to process the overhead information and sent to MUX/DEMUX 24 to separate the TDM data from the packet/cell data. The TDM data is sent to a pointer processing block 26 to phase align the pointers and path overhead data is removed and sent to a path overhead (POH) processor 28 to processes. The TDM data is then mapped by cross-connect 20 into appropriate STS-1 slots and sent to TDM interface 18. In the other path, packet data demultiplexed by MUX/DEMUX 24 are sent to pointer processing circuit 34 for processing and then provided to packet interface 32.

A significant contribution of the present invention is the mapping or assignment of the TDM STS-1 data to a contiguous block of STS-n slots in the OC-N optical payload, so that the cross-connect necessary to switch the STS-1 TDM data is of the size required to switch n STS-1 channels rather than N STS-1 channels. The number of STS-1 slots in the block needed to transport the TDM data can be dialed up to a predetermined maximum n, with the complementary dialing down of the packet data bandwidth. Therefore the present invention allows the use of a cross-connect of a manageable n×n size with reasonable power consumption for high bandwidth applications rather than an impracticable N×N sized cross-connect.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. Telecommunication equipment, comprising:
   a TDM interface operable to receive STS-n data, where n is equal to a number of STS-1 time slots in the STS-n data;
   a packet interface operable to receive packet/cell data and fill a STS-MC payload with the packet/cell data, wherein M is a number of time slots in the STS-MC payload;
   an STS-1 switch comprising an n×n cross-connect coupled to the TDM interface and operable to switch and assign each of the n STS-1 time slots of the STS-n data received at the TDM interface to any one of n STS-1 time slots;
   a multiplexer coupled to the cross-connect and the packet interface and operable to combine the switched STS-n data and the STS-MC packet/cell data into an STS-N payload for transport, where N is a number of time slots in the STS-N payload and is equal to the sum of n and M; and
   a framer for framing the STS-n signal for transport on an optical carrier;
   wherein the STS-N payload includes the STS-MC at the beginning of the payload and the STS-n at the end of the payload; and
   wherein n and M are greater than zero.

2. The telecommunications equipment, as set forth in claim 1, wherein the multiplexer is operable to receive an STS-N payload and demultiplex therefrom the STS-n data and the STS-MC data.

3. Telecommunication equipment, comprising:
   a TDM interface operable to receive STS-n data, where n is equal to a number of STS-1 time slots in the STS-n data;
   a packet interface operable to receive packet/cell data and fill a STS-MC payload with the packet/cell data, wherein M is a number of time slots in the STS-MC payload;
   an STS-1 switch comprising an n×n cross-connect coupled to the TDM interfae and operable to switch and assign each of the n STS-1 time slots of the STS-n data received at the TDM interface to any one of n STS-1 time slots;
   a multiplexer coupled to the cross-connect and the packet interface and operable to combine the switched STS-n data and the STS-MC packet/cell data into an STS-N payload for transport, where N is a number of time slots in the STS-N payload and is equal to the sum of n and M; and a framer for framing the STS-n signal for transport on an optical carrier;

wherein the STS-N payload includes the STS-n at the beginning of the payload and the STS-MC at the end of the payload; and wherein M and n are greater than zero.

4. The telecommunications equipment, as set forth in claim 3, wherein the multiplexer is operable to receive an STS-N payload and demultiplex therefrom the STS-n data and the STS-MC data.

5. A method, comprising:

switching and assigning STS-n TDM data, using an n×n cross-connect, to a contiguous block of n STS-1 time slots, n being a number of STS-1 time slots in the STS-n TDM data, the n×n cross-connect capable of assigning each of the STS-1 time slots in the STS-n data to any of the STS-1 time slots of the contiguous block of n STS-1 time slots;

combining the switched STS-n data and concatenated STS-MC packet/cell data from a packet interface into an STS-N payload for transport, where M is a number of time slots in the STS-MC data and N is a number of time slots in the STS-N payload, N being equal to the sum of n and M; and framing the STS-n payload for transport on an optical carrier;

wherein combining the switched STS-n data and STS-MC packet/cell data into an STS-N payload comprises assigning the switched STS-n data to contiguous time slots at the beginning of the STS-N payload and STS-MC data to contiguous time slots at the end of the STS-N payload; and where in n and M are greater than zero.

6. The method, as set forth in claim 5, further comprising receiving an STS-N payload and demultiplexing therefrom the STS-n data and the STS-MC data.

7. A method, comprising:

switching and assigning STS-n TDM data, using an n×n cross-connect, to a contiguous block of n STS-1 time slots, n being a number of STS-1 time slots in the STS-n TDM data, the n×n cross-connect capable of assigning each of the STS-1 time slots of the STS-n data to any of the STS-1 time slots of the contiguous block of n STS-1 time slots;

combining the switched STS-n data and concatenated STS-MC packet/cell data from a packet interface into an STS-N payload for transport, where M is a number of time slots in the STS-MC data and N is a number of time slots in the STS-N payload, N being equal to the sum of n and M; and framing the STS-n payload for transport on an optical carrier;

wherein combining the switched STS-n data and STS-MC packet/cell data into an STS-N payload comprises assigning the switched STS-n data to contiguous time slots at the end of the STS-N payload and the STS-MC data to coutiguous time slots at the beginning of the STS-N payload; and wherein n and M are greater than zero.

8. The method, as set forth in claim 7, further comprising receiving an STS-N payload and demultiplexing therefrom the STS-n data and the STS-MC data.

* * * * *

UNITED STATES PATENT AND TRADEMARK OFFICE
CERTIFICATE OF CORRECTION

PATENT NO. : 7,609,729 B2  Page 1 of 1
APPLICATION NO. : 10/161089
DATED : October 27, 2009
INVENTOR(S) : Paul Elias It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1761 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,609,729 B2 | Page 1 of 1 |
| APPLICATION NO. | : 10/161089 | |
| DATED | : October 27, 2009 | |
| INVENTOR(S) | : Paul Elias | |

It is certified that error appears in the above-identified patent and that said Letters Patent is hereby corrected as shown below:

In the Claims:

At column 4, line number 59, please delete the word "interfae" and replace with the word -- interface --.

At column 5, line number 32, please delete the words "where in" and replace with the word -- wherein --.

At column 6, line number 24, please delete the word "coutiguous" and replace with the word -- contiguous --.

Signed and Sealed this
Thirteenth Day of September, 2011

David J. Kappos
*Director of the United States Patent and Trademark Office*